United States Patent
Wu

(10) Patent No.: US 10,447,691 B2
(45) Date of Patent: Oct. 15, 2019

(54) METHOD FOR GENERATING AN AUTHENTICATING DOCUMENT

(71) Applicant: Thinkcloud Digital Technology Co., Ltd., Taichung (TW)

(72) Inventor: Yu-Jen Wu, Taichung (TW)

(73) Assignee: THINKCLOUD DIGITAL TECHNOLOGY CO., LTD., Taichung (TW)

( * ) Notice: Subject to any disclaimer, the term of this patent is extended or adjusted under 35 U.S.C. 154(b) by 153 days.

(21) Appl. No.: 15/724,585

(22) Filed: Oct. 4, 2017

(65) Prior Publication Data

US 2018/0109519 A1    Apr. 19, 2018

(30) Foreign Application Priority Data

Oct. 14, 2016 (TW) .............................. 105133184 A

(51) Int. Cl.
| | |
|---|---|
| *H04L 29/06* | (2006.01) |
| *G06F 3/0488* | (2013.01) |
| *H04N 5/225* | (2006.01) |
| *G06F 21/64* | (2013.01) |

(52) U.S. Cl.
CPC ........ *H04L 63/0861* (2013.01); *G06F 3/0488* (2013.01); *G06F 21/645* (2013.01); *H04L 63/083* (2013.01); *H04L 63/0853* (2013.01); *H04N 5/2257* (2013.01); *H04L 2463/082* (2013.01)

(58) Field of Classification Search
CPC .................................................. H04L 63/0861
USPC ............................................................. 726/7
See application file for complete search history.

(56) References Cited

U.S. PATENT DOCUMENTS 9,990,517 B2 * 6/2018 Herger ..................... G06F 21/32
2013/0332296 A1 * 12/2013 Murray, Jr. ........ G06Q 30/0605
705/26.1

* cited by examiner

*Primary Examiner* — Longbit Chai
(74) *Attorney, Agent, or Firm* — Birch, Stewart, Kolasch & Birch, LLP

(57) ABSTRACT

A method for generating an authenticating document for verifying whether a password is inputted by a genuine holder of the password is to be implemented by a network server communicable with a mobile device. The method includes: receiving, by the network server from the mobile device, a password inputted by a user via an input unit of the mobile device, and a dynamic image that is captured by an image capture module of the mobile device and that is associated with a motion of the user during input of the password; and compiling, by the network server, the authenticating document based on the password and the dynamic image when the password is verified by the network server to be correct.

9 Claims, 5 Drawing Sheets

METHOD FOR GENERATING AN AUTHENTICATING DOCUMENT

CROSS-REFERENCE TO RELATED APPLICATION

This application claims priority of Taiwanese Invention Patent Application No. 105133184, filed on Oct. 14, 2016.

FIELD

The disclosure relates to a method for generating an authenticating document, and more particularly to a method for generating an authenticating document for verifying whether a password is inputted by a genuine holder of the password.

BACKGROUND

Biometric authentication can be implemented by means of facial recognition, fingerprint identification, iris recognition, and the like. However, high cost of relevant hardware implementation hinders popularization of biometric authentication for daily use in mobile devices. Moreover, faces and irises are often exposed to the public in our daily lives and fingerprints are easily left on things touched unconsciously, resulting in high risk of identity theft. Therefore, use of character-based passwords is still a popular choice for user authentication in fields like transaction and access control. However, since character-based passwords are prone to stealing attacks, if a credit card fraud is committed, there may be dispute over the identity of the person who has made a payment by inputting the correct password.

SUMMARY

Therefore, an object of the disclosure is to provide a method for generating an authenticating document for verifying whether a password is inputted by a genuine holder of the password that can alleviate at least one of the drawbacks of the prior art.

According to the disclosure, the method is to be implemented by a network server communicable with a mobile device. The mobile device includes an input unit, an output unit and an image capture module. The mobile device executes an application program to display a prompt message on the output unit for requesting input of a password. The method includes:

receiving, by the network server from the mobile device, the password inputted by a user via the input unit, and a dynamic image that is captured by the image capture module and that is associated with a motion of the user during input of the password; and compiling, by the network server, the authenticating document based on the password and the dynamic image when the password has been verified by the network server.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
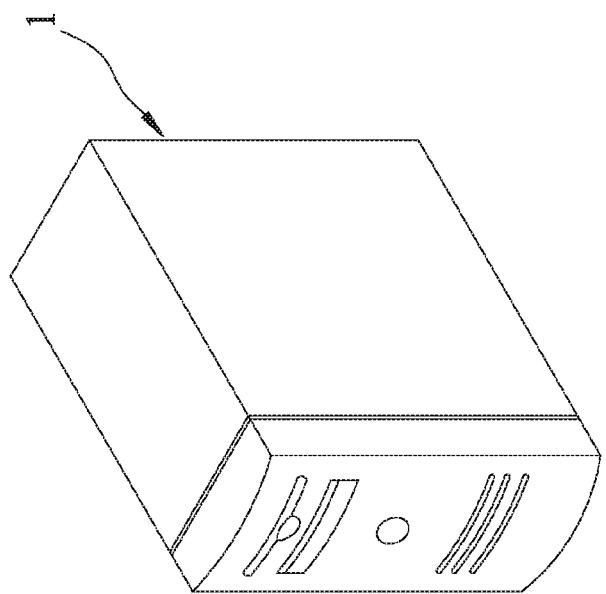
FIG. 1 is a perspective view illustrating an embodiment of a network server that is communicable with at least one mobile device and that implements a method for generating an authenticating document.
Figure 1:
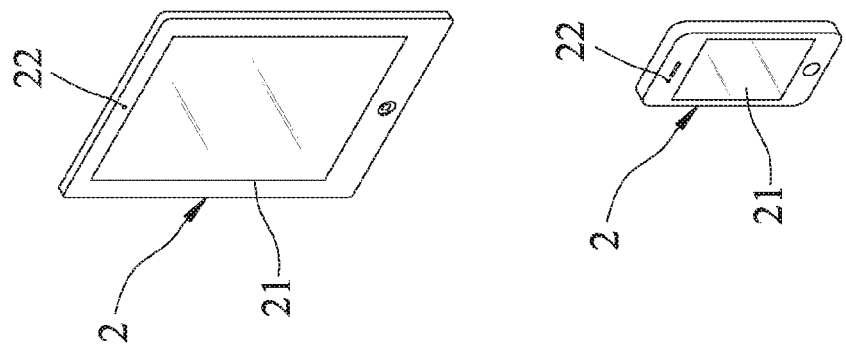
Figure 2:
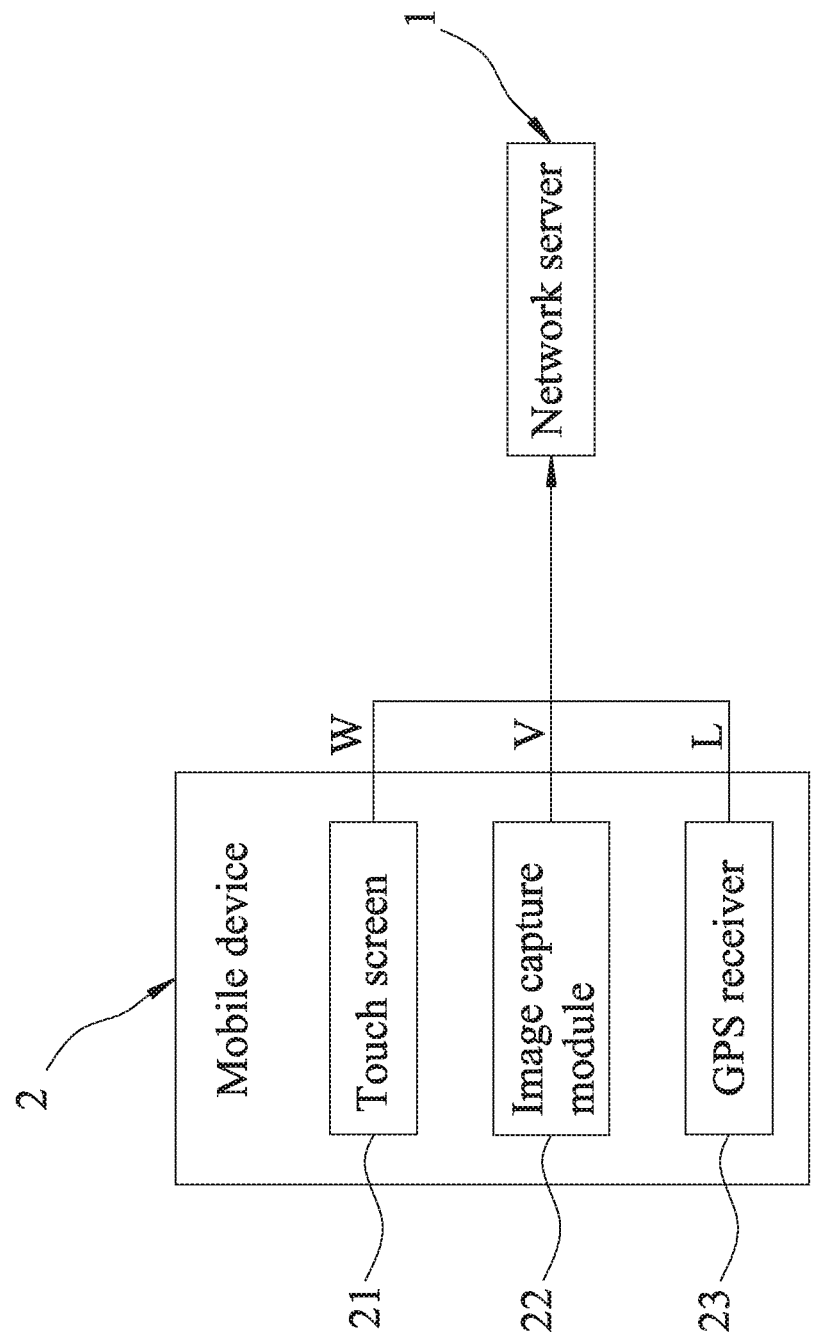
FIG. 2 is a block diagram illustrating the embodiment of the network server that is communicable with said at least one mobile device.

FIGS. 1 and 2 illustrate an embodiment of a network server 1 that is utilized to implement a method for generating an authenticating document for verifying whether a password is inputted by a genuine holder of the password. The network server 1 is communicable with at least one mobile device 2 (two mobile devices 2 are shown in FIG. 1 for exemplary purposes).

As shown in FIG. 2, the mobile device 2 includes an input unit, an output unit, an image capture module 22 to face a user of the electronic device 2, a Global Positioning System (GPS) receiver 23, and a microphone (not shown). In this embodiment, the input unit and the output unit are implemented to be integrated as a touch screen 21, but implementations thereof are not limited to the touch screen 21. For example, the input unit may be implemented by a keyboard, and the output unit may be implemented by a liquid-crystal display (LCD) or a cathode ray tube (CRT) monitor. In this embodiment, the image capture module 22 is implemented by a camera, a video recorder or a webcam, but implementation thereof is not limited thereto. The mobile device 2 may be implemented by a smartphone or a tablet, but implementation thereof is not limited thereto. The GPS receiver 23 is adapted to receive a GPS signal and to calculate a coordinate set (L) of the position of the mobile device 2. The coordinate set (L) may for example include a latitude coordinate and a longitude coordinate.

Figure 3:
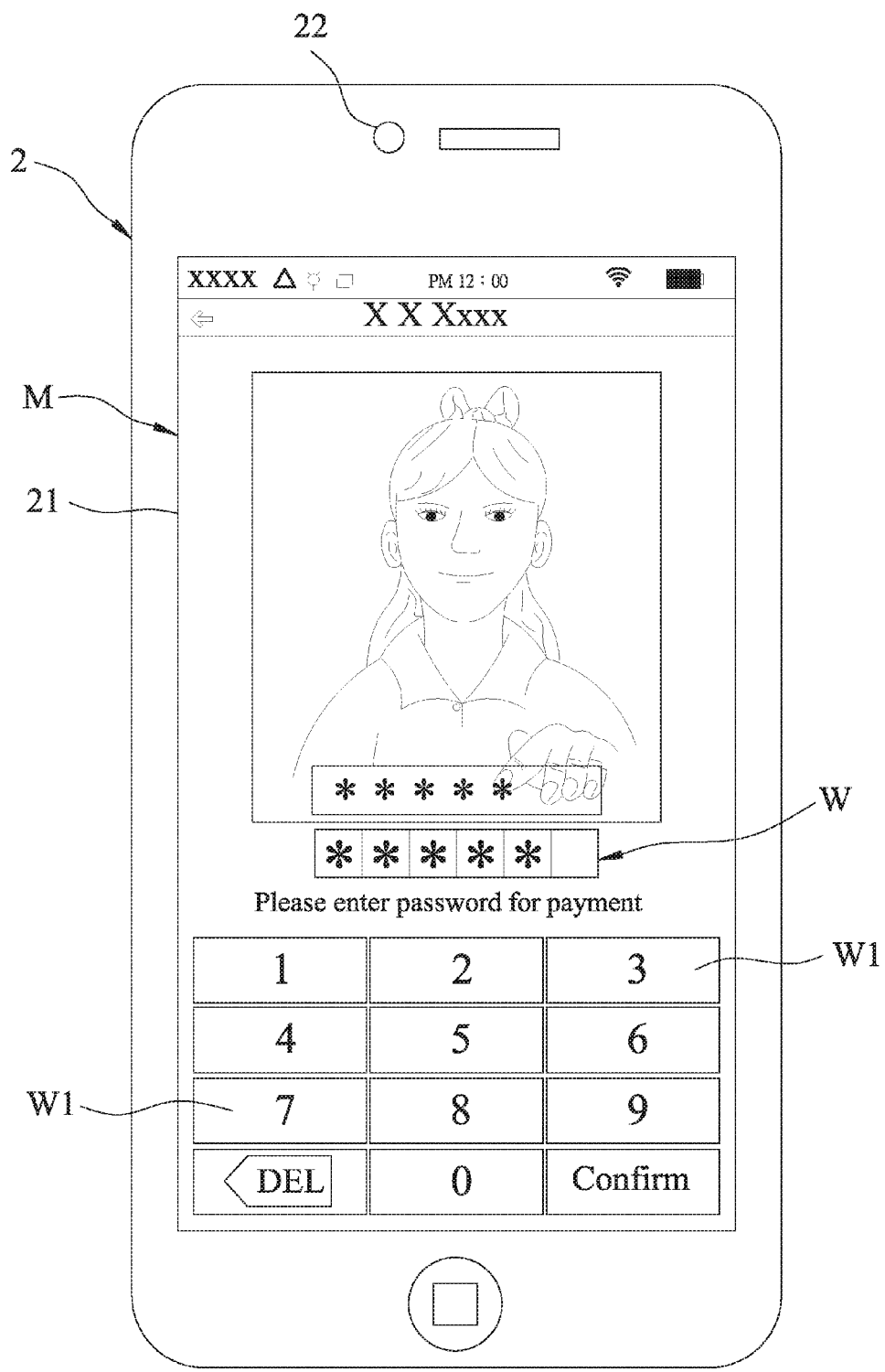
FIG. 3 is a schematic view illustrating an embodiment of the mobile device implementing the method according to this disclosure.
Figure 4:
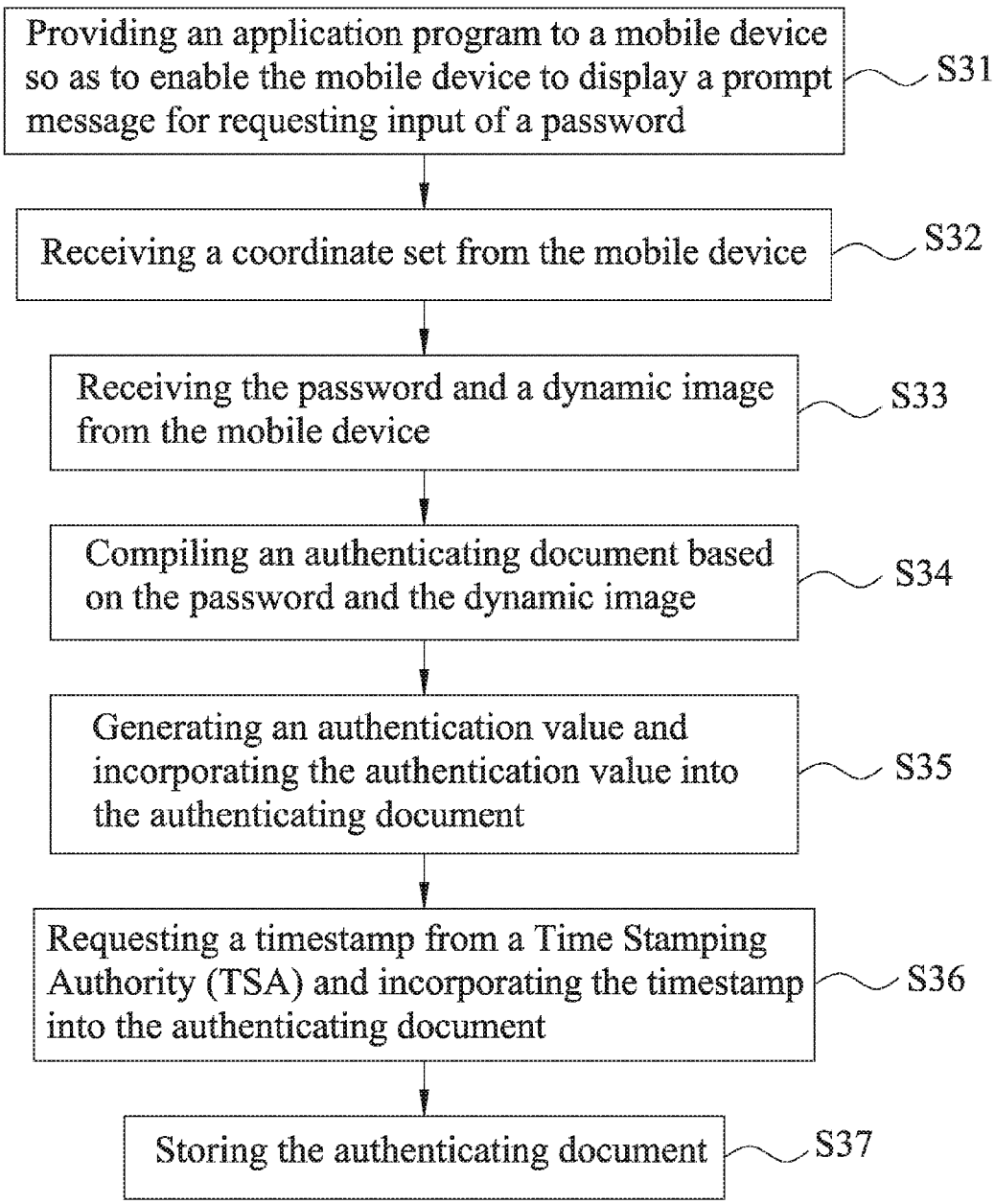
FIG. 4 is a flow chart illustrating an embodiment of the method for generating the authenticating document for verifying whether a password is inputted by a genuine holder of the password according to this disclosure.
Figure 5:
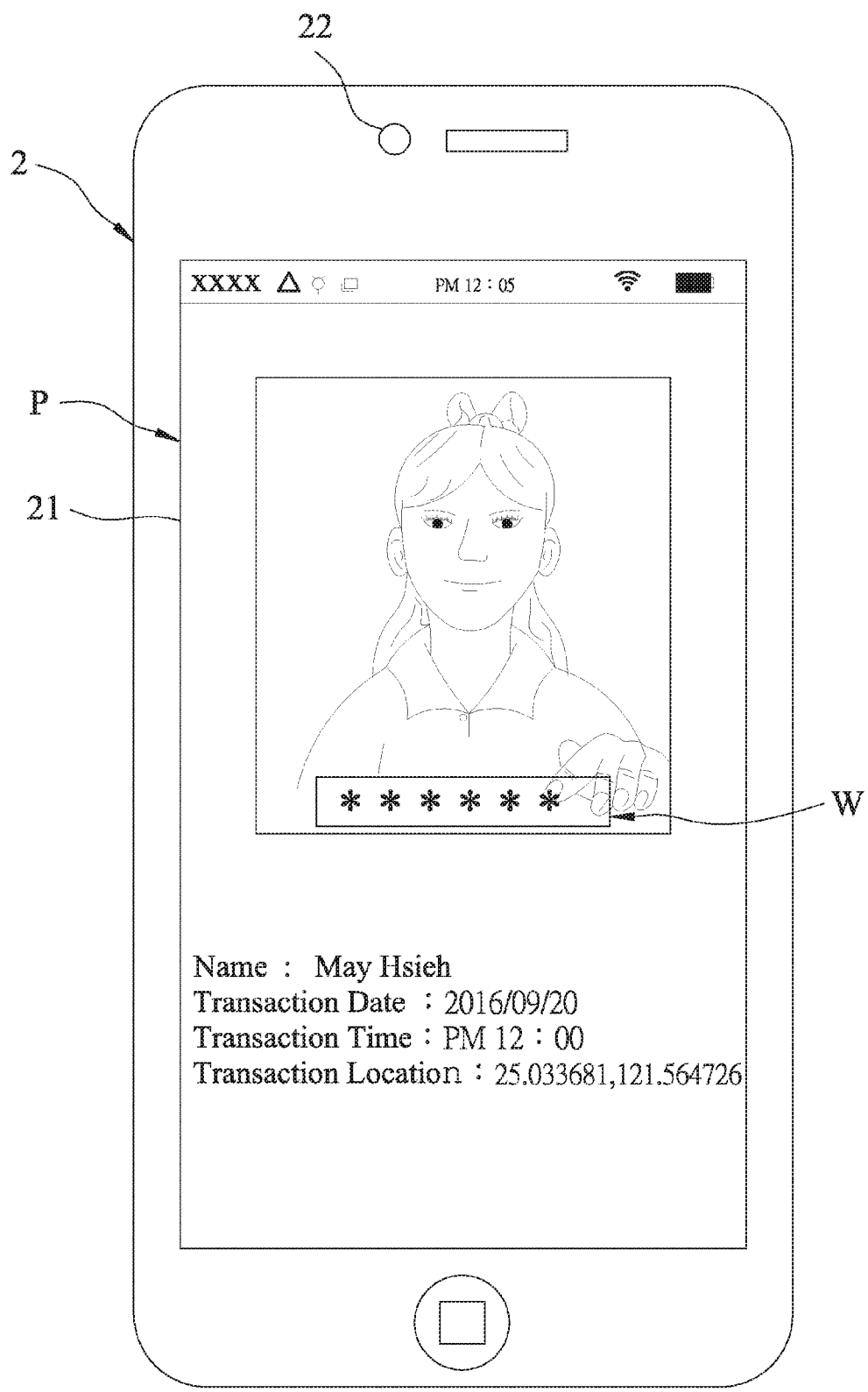
FIG. 5 is a schematic view illustrating an embodiment of the authenticating document displayed on a touch screen of the mobile device according to this disclosure.

Referring to FIGS. 1 to 5, an embodiment of the method for generating the authenticating document according to this disclosure is illustrated. The method includes steps S31 to S37 as shown in FIG. 4.

In step S31, the network server 1 provides an application program to the mobile device 2 for installation of the application program on the mobile device 2. The mobile device 2 executes the application program to display a prompt message (M) on the touch screen 21 for requesting input of a password (W). For example, the password (W) may be used to authorize a payment for a transaction through a credit card.

In step S32, the network server 1 receives, from the mobile device 2, the coordinate set (L) calculated by the GPS receiver 23 based on the GPS signal.

In step S33, the network server 1 receives, from the mobile device 2, the password (W) inputted by the user via the touch screen 21, and a dynamic image (V) that is captured by the image capture module 22 and that is associated with a motion of the user, such as facial expression and/or movement of a password-inputting hand of the user, during input of the password (W). In this embodiment, the dynamic image (V) is implemented by streaming media or a media file and stored in a format supporting at least one standard, such as Flash Video (with a filename extension .flv or .f4v), H.263, H.264 (with a filename extension .mp4), RealMedia (with a filename extension .rm), Windows Media Video (with a filename extension .wmv), MPEG-4 (with a filename extension .m4v), QuickTime File Format (with a filename extension .mov), and the like, but is not limited thereto.

In one embodiment, the password (W) thus inputted includes a plurality of characters (W1). The dynamic image (V) is overlaid, by the mobile device 2, with reproduction of each of the characters (W1) of the password (W) during input of the password (W), but implementation is not limited to what are disclosed herein. For example, in one embodiment, the dynamic image (V) is overlaid, by the mobile device 2, with presentation of a plurality of placeholder or dummy characters (e.g., asterisk symbols, *) each of which masks a respective one of the characters (W1) of the password (W) during input of the password (W) as shown in FIG. 3.

In addition, in one embodiment, the network server 1 also receives, from the mobile device 2, a voice signal that is inputted by the user via the microphone of the mobile device 2 and that is associated with a record of the user's voice during input of the password (W).

In step S34, the network server 1 compiles the authenticating document (P) (see FIG. 5) based on the password (W), the dynamic image (V) overlaid with the reproduction of the characters (W1) or the presentation of the placeholder or dummy characters, the coordinate set (L) and the voice signal when the password (W) is verified by the network server 1 to be correct (i.e., the inputted password (W) is valid). In this embodiment, the authenticating document (P) is implemented to be stored as a file in a portable document format (PDF), but implementation of the storage of the authenticating document (P) is not limited thereto.

In step S35, the network server 1 generates an authentication value based on the password (W), the dynamic image (V) and the coordinate set (L), and incorporates the authentication value into the authenticating document (P). In this embodiment, the authentication value is implemented as a Hash value calculated by irreversible Hashing algorithms, but implementation of the authentication value is not limited thereto. Therefore, the authentication value would be different when at least one coordinate of the coordinate set (L), the dynamic image (V), or any one of the characters (W1) of the password (W) is altered. It should be noted that the dynamic image (V) discussed in steps S34 and S35 is overlaid with the reproduction of the characters (W1) or the presentation of the placeholder or dummy characters, but in other embodiments, the dynamic image (V) may be the original dynamic image captured by the image capture module 22 without being overlaid with any other form of information.

In step S36, the network server 1 requests a timestamp from a Time Stamping Authority (TSA) and incorporates, the timestamp into the authenticating document (P). As a result, creation of the authenticating document (P) at a specific time point can be verified by the TSA based on the timestamp incorporated in the authenticating document (P). Therefore, once the time the authenticating document (P) was last modified does not correspond to the timestamp, it can be determined that the contents in the authenticating document (P) may have been altered.

In step S37, the network server 1 stores the authenticating document (P).

It should be noted that the order of execution of steps S35 and S36 can be interchanged. That is to say, the network server 1 may first request the timestamp from the TSA, and then incorporate the timestamp obtained from the TSA into the authenticating document (P), followed by generating the authentication value and incorporating the authentication value into the authenticating document (P) which has been incorporated with the timestamp. Since implementation of authentication of an electronic document by the authentication value is well known to those skilled in the relevant art, detailed explanation of the same is omitted herein for the sake of brevity.

In a scenario where a client disputes a payment for a transaction through a credit card and the aforementioned password input, and argues that the payment is not made by him/herself, a company issuing the credit card can inspect the payment by checking the authenticating document (P), so as to verify the time when the payment is made based on the timestamp incorporated therein, the location where the payment is made based on the coordinate set (L) incorporated therein, and an image of the user who inputted the password based on the dynamic image (V). Consequently, the method of this disclosure facilitates verification of payments for transactions and settling of relevant disputes.

In summary, the method of this disclosure includes compiling the dynamic image (V) overlaid with representation of the password (W) (e.g., an exact duplicate of the actual password (W) or a string of placeholder/dummy characters) into the authenticating document (P), and generating the authentication value based on the inputted password (W), the dynamic image (V) and the coordinate set (L), so as to verify whether the password (W) is inputted by a genuine holder of the password even when the password is determined to be valid. Moreover, the method of this disclosure includes incorporating the timestamp obtained from the TSA into the authenticating document (P), so as to facilitate verification of the time when the authenticating document (P) came into existence. Because of previously mentioned features, the method of this disclosure may be utilized to improve security of trading.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for generating an authenticating document for verifying whether a password is inputted by a genuine holder of the password, the method to be implemented by a network server communicable with a mobile device, the mobile device including an input unit, an output unit and an image capture module, said method comprising:

receiving, by the network server from the mobile device executing an application program to display a prompt message on the output unit for requesting input of a password, the password inputted by a user via the input unit, and a dynamic image that is captured by the image capture module at a user interface from the user and that is associated with a motion of the user during input of the password, wherein the dynamic image of the user is overlaid, by the mobile device, with presentation of a plurality of placeholder characters each of which masks a respective one of the characters of the password during input of the password and capture of the dynamic image; and compiling, by the network server, the authenticating document to be stored as a file based on at least the password and the dynamic image of the user when the password is verified by the network server to be correct.

2. The method as claimed in claim 1, subsequent to the compiling the authenticating document, further comprising:

generating, by the network server, an authentication value based on the password and the dynamic image, and incorporating, by the network server, the authentication value into the authenticating document.

3. The method as claimed in claim 2, subsequent to the compiling the authenticating document and prior to the generating an authentication value, further comprising:

requesting, by the network server, a timestamp from a Time Stamping Authority (TSA) and incorporating, by the network server, the timestamp into the authenticating document.

4. The method as claimed in claim 2, prior to the generating an authentication value, further comprising:

receiving, by the network server from the mobile device, a coordinate set of a position of the mobile device; wherein the generating an authentication value includes generating, by the network server, the authentication value further based on the coordinate set.

5. The method as claimed in claim 4, the mobile device further including a Global Positioning System (GPS) receiver that is adapted to receive a GPS signal and to calculate the coordinate set of the position of the mobile device, wherein the receiving a coordinate set includes receiving, by the network server from the mobile device, the coordinate set calculated by the GPS receiver based on the GPS signal.

6. The method as claimed in claim 1, wherein the compiling the authenticating document further includes requesting, by the network server, a timestamp from a Time Stamping Authority (TSA) and incorporating, by the network server, the timestamp into the authenticating document.

7. The method as claimed in claim 1, wherein:

the password includes a plurality of characters; and the dynamic image is overlaid, by the mobile device, with presentation of a plurality of placeholder characters each of which masks a respective one of the characters of the password during input of the password.

8. The method as claimed in claim 1, wherein:

the password includes a plurality of characters; and the dynamic image is overlaid, by the mobile device, with reproduction of each of the characters of the password during input of the password.

9. The method as claimed in claim 1, further comprising:

storing, by the network server, the authenticating document in the network server.

\* \* \* \* \*